(12) United States Patent
Kaufman et al.

(10) Patent No.: US 7,177,761 B2
(45) Date of Patent: Feb. 13, 2007

(54) MAP DISPLAY FOR A NAVIGATION SYSTEM

(75) Inventors: Michael L. Kaufman, Chicago, IL (US); James M. Herbst, Chicago, IL (US); Steven P. Devries, Schererville, IN (US); Eric Groth, Buffalo Grove, IL (US)

(73) Assignee: Navteq North America, LLC, Chicago, IL (US)

( * ) Notice: Subject to any disclaimer, the term of this patent is extended or adjusted under 35 U.S.C. 154(b) by 118 days.

(21) Appl. No.: 10/975,030

(22) Filed: Oct. 27, 2004

(65) Prior Publication Data

US 2006/0089798 A1    Apr. 27, 2006

(51) Int. Cl.
*G01C 21/30* (2006.01)
(52) U.S. Cl. .............. 701/211; 340/995.19; 340/995.24
(58) Field of Classification Search ............... None
See application file for complete search history.

(56) References Cited

U.S. PATENT DOCUMENTS

| | | | |
|---|---|---|---|
| 4,504,913 A | 3/1985 | Miura et al. | 364/449 |
| 4,937,570 A | 6/1990 | Matsukawa et al. | 340/905 |
| 5,161,886 A | 11/1992 | De Jong et al. | 364/449 |
| 5,508,931 A | 4/1996 | Snider | 364/449 |
| 5,544,060 A | 8/1996 | Fujii et al. | 364/444 |
| 5,748,109 A * | 5/1998 | Kosaka et al. | 340/995.14 |
| 5,945,976 A * | 8/1999 | Iwamura et al. | 345/419 |
| 6,006,161 A | 12/1999 | Katou | 701/212 |
| 6,038,507 A | 3/2000 | Miyano | 701/202 |
| 6,556,917 B1 | 4/2003 | Wawra et al. | 701/207 |
| 6,741,929 B1 | 5/2004 | Oh et al. | 701/209 |
| 2004/0098175 A1 | 5/2004 | Said et al. | 701/1 |
| 2004/0218910 A1* | 11/2004 | Chang et al. | 386/98 |
| 2004/0243307 A1* | 12/2004 | Geelen | 701/213 |

FOREIGN PATENT DOCUMENTS

WO    WO2004/076978    9/2004

* cited by examiner

*Primary Examiner*—Michael J. Zanelli
(74) *Attorney, Agent, or Firm*—Grace Law O'Brien; Frank J. Kozak; Jon D. Shutter

(57) ABSTRACT

A system and method are disclosed for displaying map information on a computing device. Data are stored for rendering a simulation of travel along one or more road segments prior to embarking on travel along the road segments. The simulation is comprised of a sequence of views of the road network along each road segment from vantage points above or along the road network. Each road segment may be part of a calculated route and the simulation may include views for all the road segments contained in the calculated route. While the computing device is being conveyed along each road segment, the data stored for the simulation is used to show a view of the road network that includes the current position of the computing device on a display of the computing device.

43 Claims, 7 Drawing Sheets

MAP DISPLAY FOR A NAVIGATION SYSTEM

BACKGROUND OF THE INVENTION

The present invention relates to displaying map information on a computing device.

Various kinds of systems and applications are available that provide individuals with useful information while traveling. For example, navigation systems installed in vehicles provide useful information to vehicle drivers and passengers, including information for finding desired destinations, as well as guidance information for following routes to desired destinations. Similar features are available on portable (e.g., handheld) devices. These types of portable devices can be used in vehicles, but can also be carried by pedestrians or by persons using other modes of transportation, such as trains, ferries, and so on. These types of portable devices include personal navigation systems (PNSs), which are portable devices designed specifically to provide navigation and/or map-related features, such as destination searches, routing and/or map display. These types of portable devices also include general purpose devices, such as personal digital assistants (PDAs), on which are installed navigation and/or map-related applications.

A continuing consideration associated with providing navigation and/or map information is the efficient utilization of available computing resources. This consideration is especially applicable to portable devices, but also applies to other devices, such as in-vehicle systems. Portable devices, such as personal navigation devices and personal digital assistants, may have relatively limited computing resources, such as processors or memory, compared to desktop or notebook computers. Therefore, efficient utilization of available computing resources can be a factor when providing navigation and/or map related features on a portable device. Another consideration associated with providing navigation and/or map information on portable devices is that efficient use of available computing resources may conserve energy usage, which may improve or extend the operating time before recharging of the portable device is needed.

Accordingly, there is a need to provide navigation and/or map-related features on portable navigation systems in a manner that uses available computing resources efficiently.

Further, there is a need to provide navigation- and/or map-related features efficiently on various kinds of systems, including portable systems and in-vehicle systems.

SUMMARY OF THE INVENTION

To address these and other objectives, the present invention includes a system and method for displaying map information on a computing device. Data are stored for rendering a simulation of travel along one or more road segments prior to embarking on travel along the road segments. The simulation is comprised of a sequence of views of the road network along each road segment from vantage points above or along the road network. Each road segment may be part of a calculated route and the simulation may include views for all the road segments contained in the calculated route. While the computing device is being conveyed along each road segment, the data stored for the simulation is used to show a view of the road network that includes the current position of the computing device on a display of the computing device.

DETAILED DESCRIPTION OF THE PRESENTLY PREFERRED EMBODIMENTS

I. First Embodiment

Figure 1:
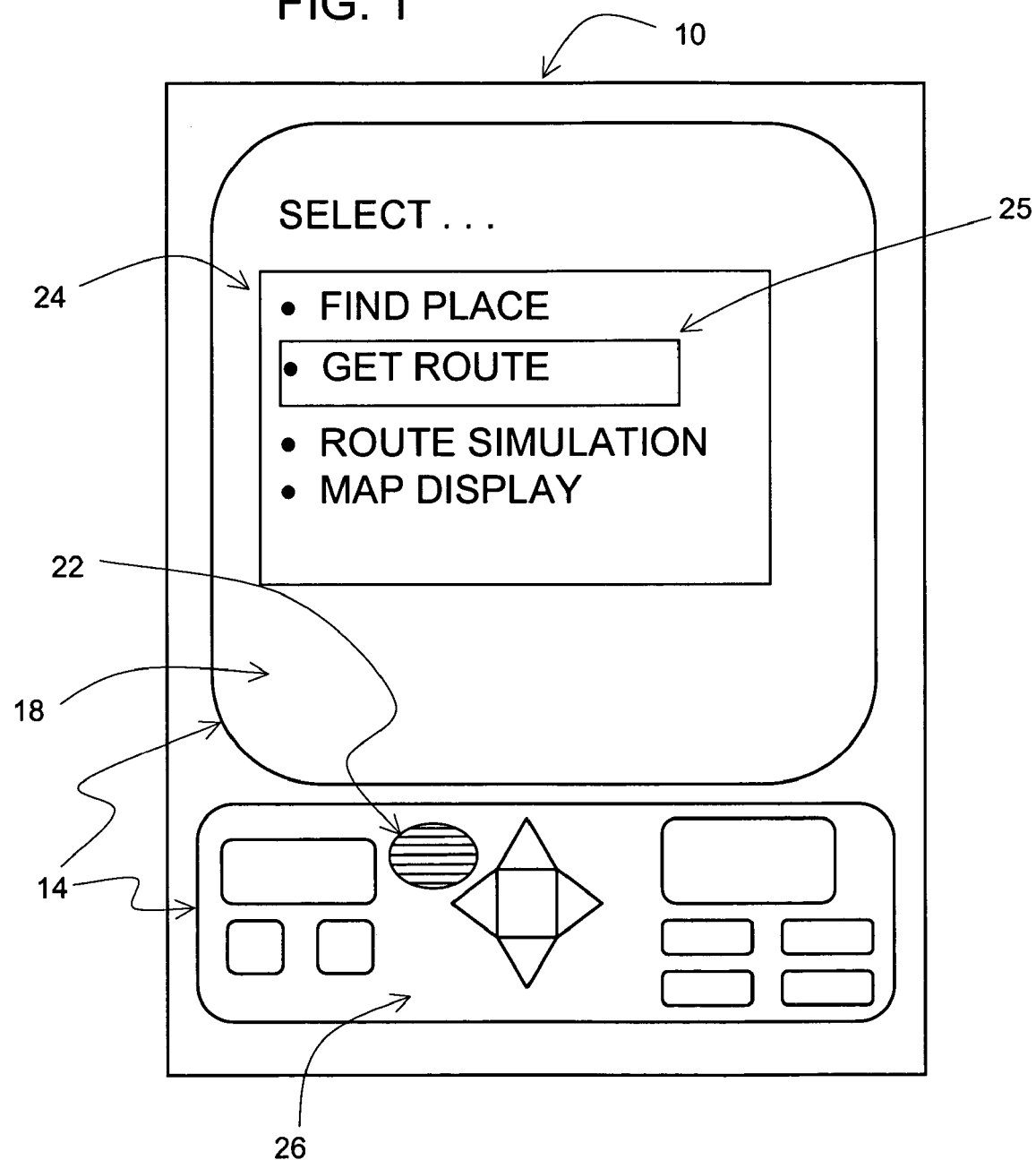
FIG. 1 illustrates a front side of a portable navigation system that includes a first embodiment of the disclosed system and method.

FIG. 1 shows a portable navigation system 10. The portable navigation system 10 is a combination of hardware and software components. The portable navigation system 10 includes a self-contained power source, such as a battery (not shown). The portable navigation system 10 has a size and weight so that it can easily be carried by a person. The portable navigation system 10 may be designed primarily for navigation purposes, or alternatively, the portable navigation system 10 may be a general purpose device, such as a personal digital assistant (PDA), on which is installed navigation application software.

Embodiments of the portable navigation system may be used with mounting hardware so that the portable navigation system may be temporarily or permanently mounted in or on a vehicle, such as an automobile. The mounting hardware may allow the portable navigation system to be removable so that it can be either mounted in a vehicle or removed and carried by a person.

The portable navigation system 10 includes a user interface 14. The user interface 14 includes a means for receiving input from a user and a means for conveying information to the user. In this embodiment, the user interface 14 of the portable navigation system 10 includes a display 18 and a speaker 22. The user interface 14 also includes an input panel 26 that includes a keypad, buttons, a toggle, or other means by which a user can manually provide input commands or other information. The user interface of the portable navigation system 10 may also include a microphone and appropriate speech recognition technology that enables a user to enter information verbally. The user interface 14 of the portable navigation system 10 may also include a touch screen and/or stylus. Other types of user interface technology may also be used.

The user interface 14 includes appropriate programming to allow a user to receive information from and provide information to the portable navigation system 10. The user interface programming may provide for presentation of menus, icons, etc., on the display screen 18 of the portable navigation system in order to allow the user to select programs and features, input commands, etc. FIG. 1 shows one example of a way that the user interface allows a user to select a function. A menu 24 is presented on the display screen 18 of the portable navigation system 10. The menu 24 lists several different functions. The user interface programming renders a box 25 highlighting one of the menu entries. The user interface programming allows the user to move the highlighting box 25 from one entry on the list to another. Once the function desired by the user is highlighted with the box 25, the user can select the desired function by operating an appropriate key on the keypad.

Figure 2:
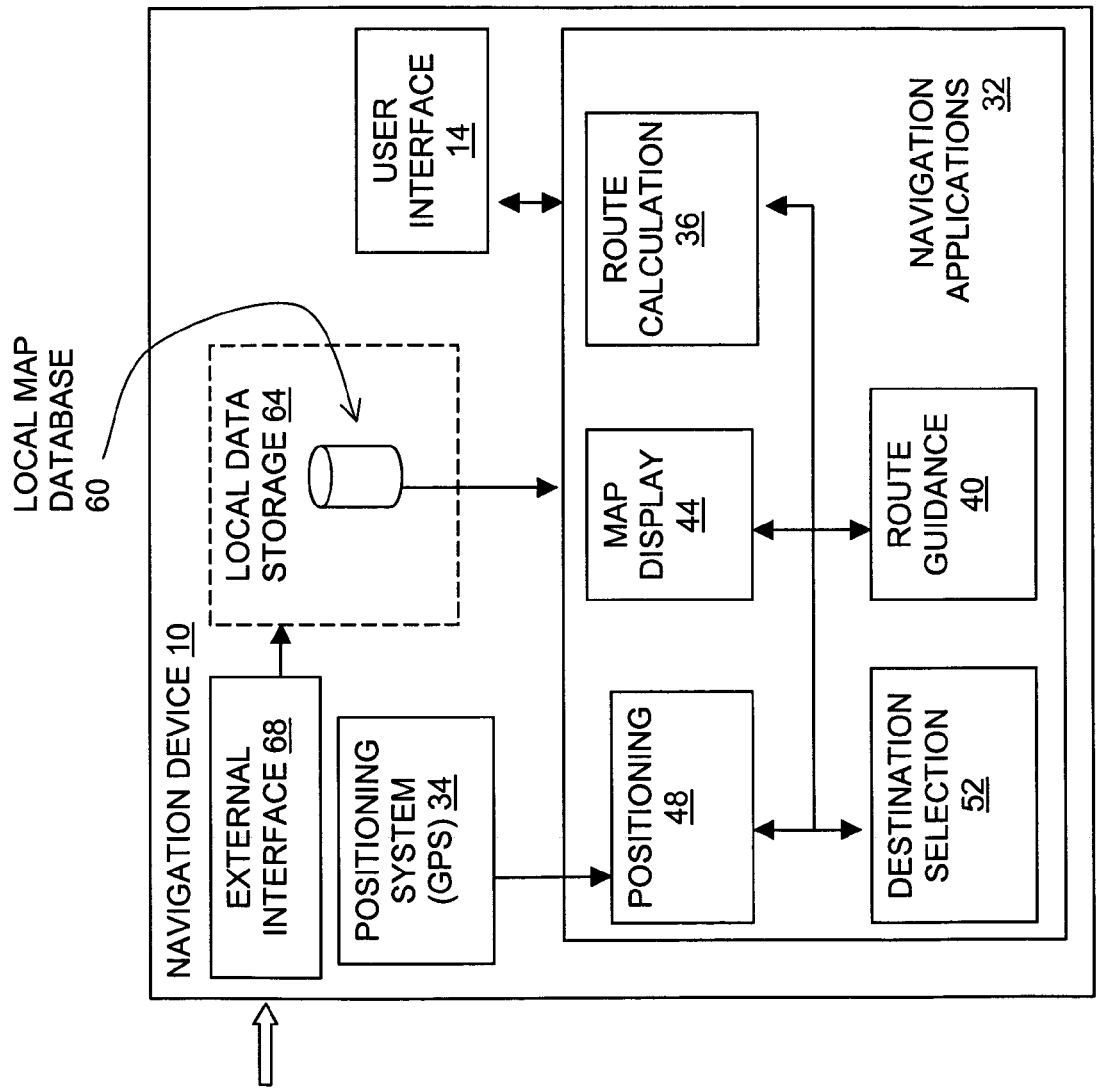
FIG. 2 is a block diagram showing components of the portable navigation system in FIG. 1.

FIG. 2 shows a block diagram of some of the components of the portable navigation system 10. The portable navigation system 10 includes a positioning system 34. The positioning system 34 determines a current position of the portable navigation system 10. The positioning system 34 may be implemented by any location sensing device or technology. For example, the positioning system may include a GPS unit, or systems that use time-of-arrival, direction-of-arrival, triangulation, WiFi, RFID, Loran, dead reckoning, or combinations of these or other systems.

In this embodiment, the portable navigation system 10 includes navigation applications 32. The navigation applications 32 are software programs that perform certain navigation-related or map-related functions. These navigation applications 32 are stored on an appropriate data storage medium in the portable navigation system 10. The navigation applications 32 are run, when needed. Included among the navigation applications 32 are a route calculation application 36, a route guidance application 40, a map display application 44, a positioning application 48 and a destination selection application 52. Other embodiments may have more or fewer of these applications. Alternatively, in some embodiments, two or more of these applications may be combined.

The portable navigation system 10 includes a local map database 60. The local map database 60 is stored on a data storage medium 64 in the portable navigation system 10. The map database 60 is used by the navigation applications 32 to provide navigation-related features. The map database 60 includes information about the roads, intersections, points of interest, and other geographic features in a covered geographic area. The covered geographic area may include one or more metropolitan areas, states, countries, regions, or combinations thereof.

In one embodiment, the local map database 60 is loaded into the portable navigation system 10 via an external interface 68. According to this embodiment, a program installed on a personal computer allows a user to select one or more smaller coverage areas from a relatively large coverage area to install on the portable navigation system 10. For example, a person may select the Los Angeles metropolitan area from the entire United States and install the map data for the Los Angeles metropolitan area on the portable navigation system 10.

The navigation applications 32 work together and use the map database 60 to provide various kinds of navigation functions. As an example, the navigation applications may be used for obtaining a route to a desired destination. According to this example, a user may use the destination selection application 52 to find a desired place. The starting point for the route is assumed to be the location of the user, which is determined by the positioning application 48 used in conjunction with the positioning system 34. Data indicating the location of the desired destination and the location of the starting point are forwarded to the route calculation application 36. The route calculation application 36 determines a route from the starting point to the destination and then forwards data indicating the route to the route guidance application 40. The route guidance application 40 generates appropriate directions for the user to follow the route.

When the portable navigation system is being used to guide the user along a route to a destination, it can be useful to show the user a graphical map of the area in which the user is located. The map display application 44 can be used for this purpose. The map display application 44 receives the data indicating the route from the route calculation application 36 and data indicating the user's current position from the positioning application 48. The map display application 44 accesses data from the local map database 60 for generating a graphical map image of the geographic area around the user's current position. The map display application 44 renders an image on the display screen 18 of the portable navigation device 10 showing the geographic area around the user's current position. The image may show the roads located in the vicinity of the user. An indicator mark may be superimposed on the image to indicate the user's current position. Also, the route that the user should follow may be indicated on the image by highlighting.

Figure 3:
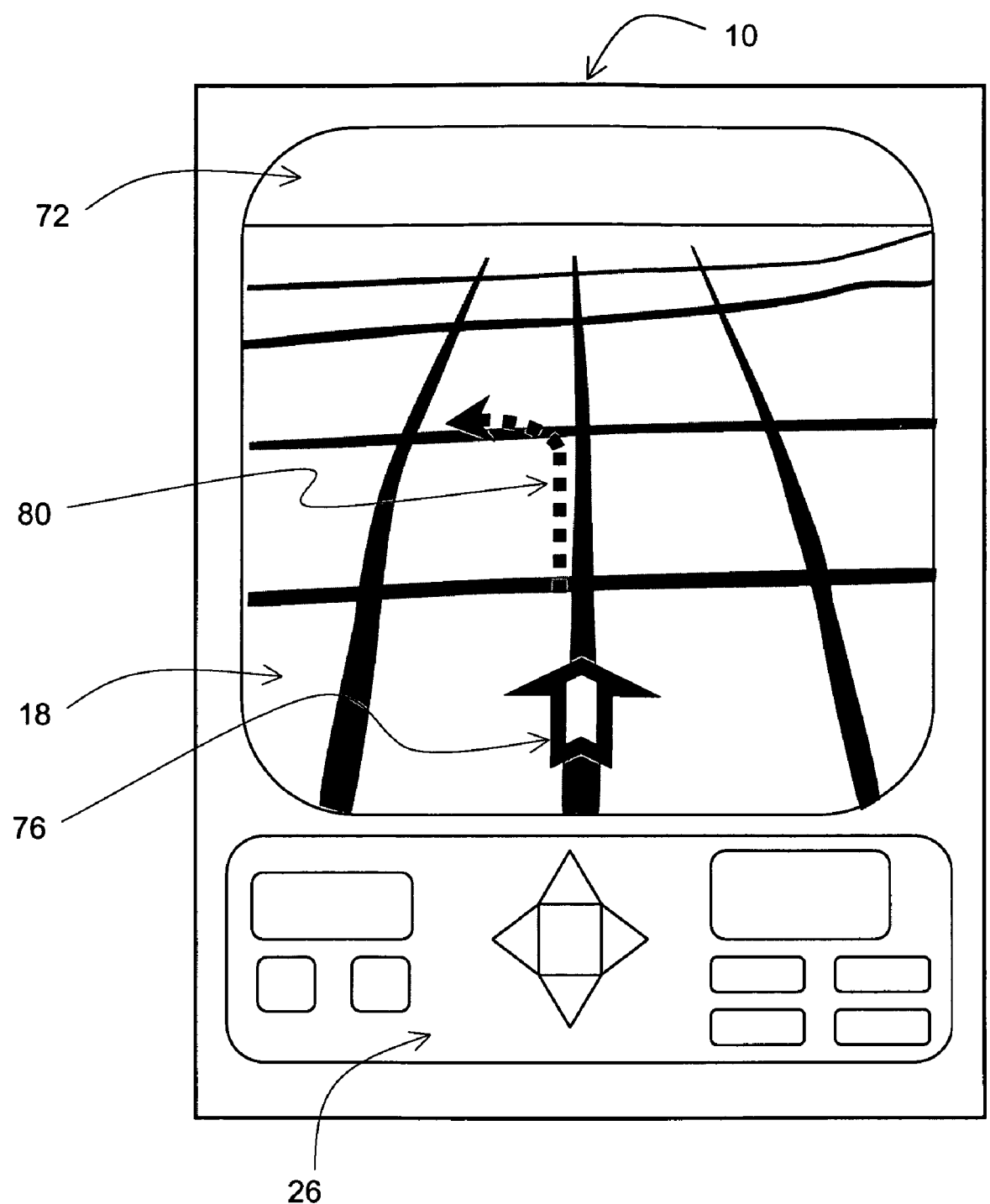
FIG. 3 illustrates the portable navigation system of FIG. 1 with the display showing a map image of the area around the current position of the portable navigation system.

Operation of the map display application 44 to produce a graphical map image of the road network around a user's location is illustrated in FIG. 3. FIG. 3 shows a map image 72 being displayed on the display screen 18 of the portable navigation system 10. The map image 72 shows the area around the position of the portable navigation system 10, including a portion of the road network. The map image 72 shows an indicator 76 that corresponds to the position of the portable navigation system 10 relative to the roads being displayed in the map image 72. If the portable navigation system is being transported in a vehicle, the indicator 76 corresponds to the position of the vehicle. An indicator arrow 80 shows a maneuver that should be taken at an intersection ahead of the position of the portable navigation system 10 in order to follow a calculated route to a destination.

FIG. 3 shows the area around the position of the portable navigation system in a perspective view. In alternative embodiments, the area around the position of the portable navigation system may be shown in a 2D view (e.g., a view looking straight down) or in any other type of view.

Figure 4:
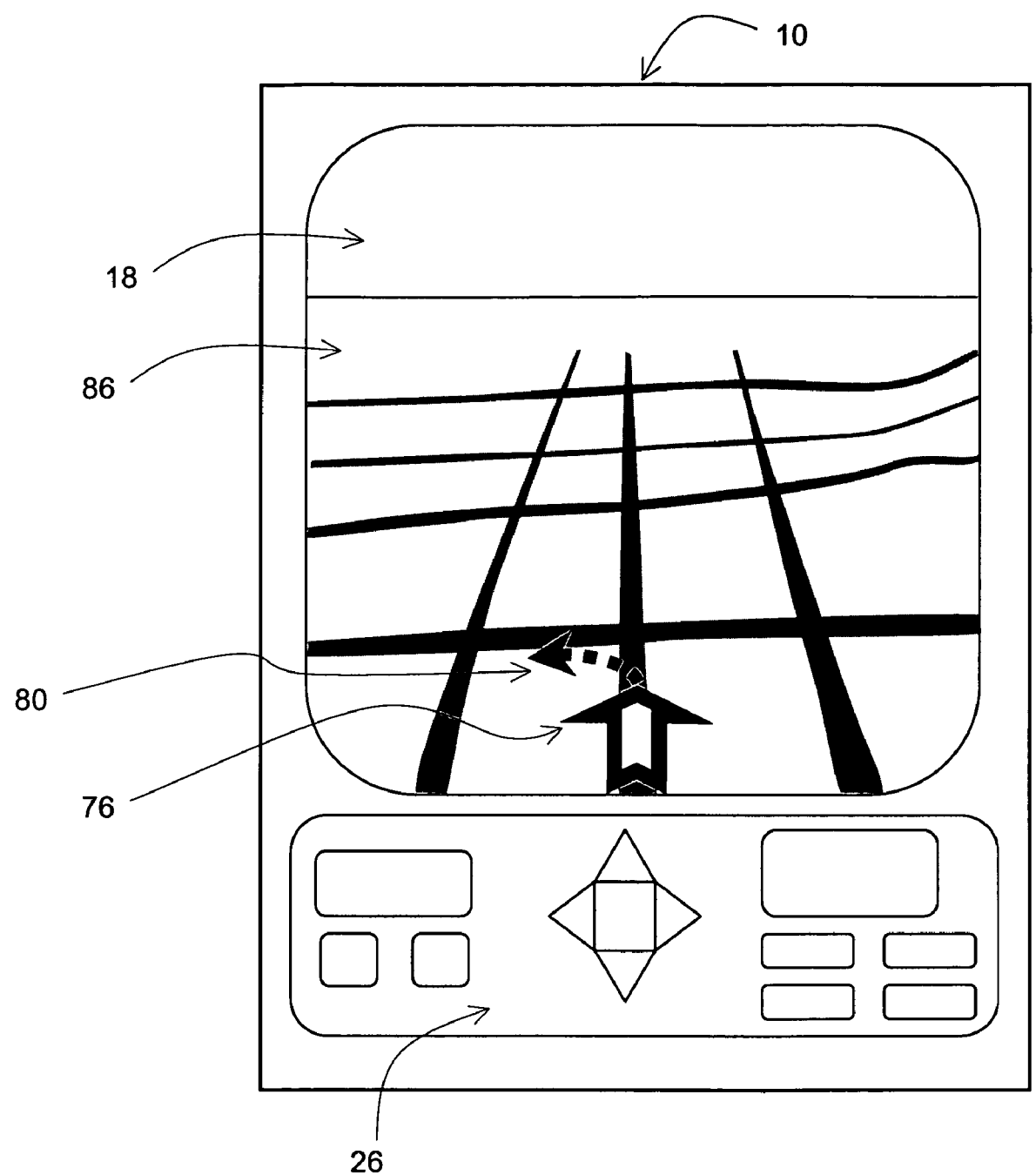
FIG. 4 illustrates the portable navigation system of FIG. 1 with the display showing a map image of the area surrounding the current position of the portable navigation system after it has been transported a distance along a route.

As the user travels along the route, the positioning system 34 in the portable navigation system 10 detects the change of position. Data indicating this change of position is forwarded to the map display application 44. The map display application 44 updates the graphical map image being displayed to indicate the new position of the portable navigation system 10. FIG. 4 shows the portable navigation system 10 with an updated graphical map 86 on the display 18. The updated graphical map 86 shows the position of the portable navigation system 10 after it has advanced toward the intersection at which a turn should be made. When updating the map image, the map display application 44 modifies the image to reflect a new current position of the portable navigation system 10 relative to the represented geographic features. The map display application 44 may modify the vantage point of the image, e.g., by advancing the vantage point. When advancing the vantage point, the map display application may cause some geographic features to no longer be shown in the image, whereas other geographic features are caused to come into view. Additional data is accessed from the map database 60, if necessary.

The portable navigation system uses an appropriate rate for rendering updated map images to reflect the changing current position of the portable navigation system. In some embodiments, the rendering of the sequence of updated images occurs fast enough (e.g., 24 frames per second) that the change of position in the images appears continuous. Alternatively, a slower rate of rendering a sequence of updated image may be used.

Some portable navigation systems provide additional kinds of features. For example, some portable navigation systems may provide map display views, similar to those shown in FIGS. 3 and 4, even when the user is following a route to a desired destination. According to this feature, the map display application 44 may generate and display a map image that shows the road network in the vicinity of the user and possibly a marker indicating the user's position relative to the road network. Such a map image may be similar to those in FIGS. 3 and 4, except with the highlighted route omitted.

Another feature provided by some portable navigation systems is a route simulation. According to this feature, after a user has specified a destination for a route, the user is provided with an option to be presented with a simulation of the route. The user may be presented with the option to select the route simulation feature by means of a menu generated as part of the user interface and presented on the display of the portable navigation system. For example, the menu 24 shown in FIG. 1 includes an entry for selection of the route simulation feature.

The route simulation feature provides the user with guidance instructions and/or map images that simulate the kind of information that the portable navigation system would be providing to the user if the user were actually traveling along the route. The guidance instructions may correspond exactly to what the portable navigation system 10 would provide to the user if the user were actually traveling along the route, e.g., "TURN LEFT AT NEXT INTERSECTION" or "ENTER FREEWAY ON THE RIGHT". The map images that are provided during the simulation may also correspond exactly to what would be presented to the user while traveling along the route. For example, the map images presented during a simulation may look like the images shown in FIGS. 3 and 4. When a route simulation is performed, travel along the route is also simulated. The simulated travel may be accelerated or abridged for the convenience of the user. For example, simulation of a route that would normally take an hour to actually travel may be accelerated or abridged to transpire in just several minutes. Thus, a user can become familiar with the roads and maneuvers in a route without waiting for simulated long stretches on roads, waiting for stoplights, etc.

In a present embodiment, when the portable navigation system is used to calculate a route to a destination, a simulation of the route is prepared. In this embodiment, the simulation of the entire route (or at least a portion of the entire route) is prepared at the same time the route is being calculated or immediately after calculation of the route. Data for displaying the simulation is saved in the portable navigation system. This data may be the data accessed from the map database that would be needed to present the images that comprise the simulation. Alternatively, this data may be a video stream of the route simulation.

If the user wants to view the simulation before embarking on the route, the simulation is presented to the user, as described above. However, if the user does not wish to view the simulation prior to embarking on the route, the data for presenting the simulation is saved in the portable navigation system nonetheless.

Regardless of whether the user has viewed the simulation before embarking on the route, when the user travels along the route, the portable navigation system uses the saved simulation data to provide guidance and/or map images during actual travel along the route. During actual travel along the calculated route, there are several ways that the guidance and/or map images based on the simulation data can be matched to the actual corresponding locations along the route. One way is to match the speed of the vehicle in which the navigation system is located to the playback speed of the simulation. Another way to match the playback of the simulation to the position along the route is to determine the actual position of the portable navigation system, e.g., using the positioning system, and then match the actual position to the corresponding position in the simulation. Still another way to match the playback of the simulation to the position along the route is to have the user perform the operation manually, e.g., using the user interface. Regardless of how the simulation is matched to the actual position of navigation system, the portion of the simulation that matches the navigation system's actual position is presented to the user.

Using the saved simulation data to present routing guidance information and/or map images to the user has several advantages. By using the saved simulation data, the portable navigation system does not need to calculate and render new map images as the route is being traveled. Another advantage is that the simulation can provide for continuity of guidance and map images during travel along a route even when the current position of the portable navigation system cannot be determined, e.g., where the GPS signal is temporarily lost.

Figure 5:
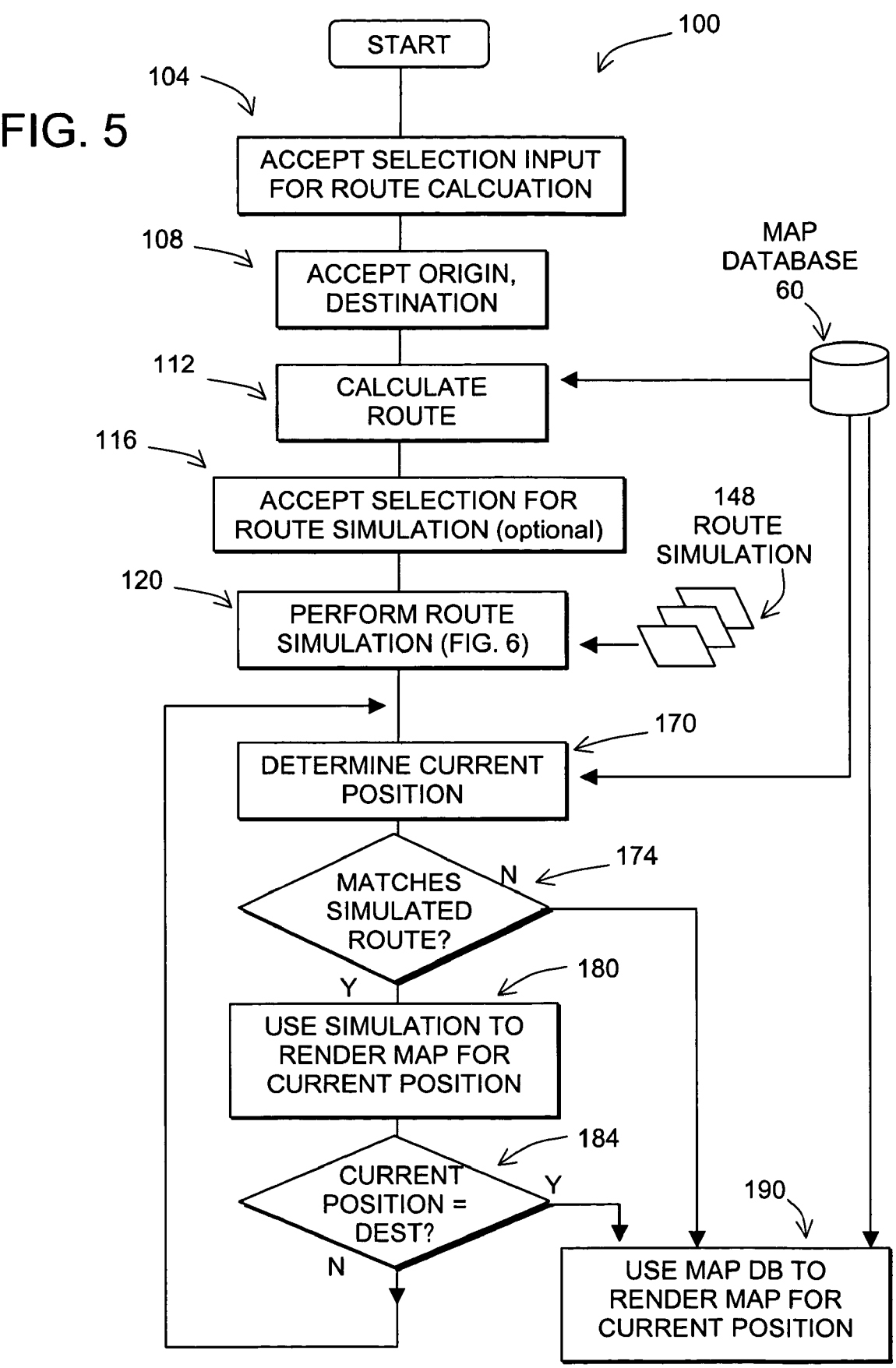
FIG. 5 is a flowchart of a process for using route simulation data for rendering an image of the area around the current position of the portable navigation system.

FIG. 5 shows a flowchart for a process 100 for using a pre-determined simulation to present guidance and/or map images to a user traveling along the route. After the user has selected the route calculation function (Step 104), the user selects a destination (Step 108). In this embodiment, the origin is assumed to be the current position of the portable navigation system although the user may be provided with the option to specify a different origin. The current position of the portable navigation system is obtained from the positioning application (48 in FIG. 2).

After the origin and destination are specified, the route is calculated (Step 112). At this point, the user may be provided with the option to view a route simulation (Step 116). A route simulation is prepared, regardless of whether the user chooses to view the simulation (Step 120).

Figure 6:
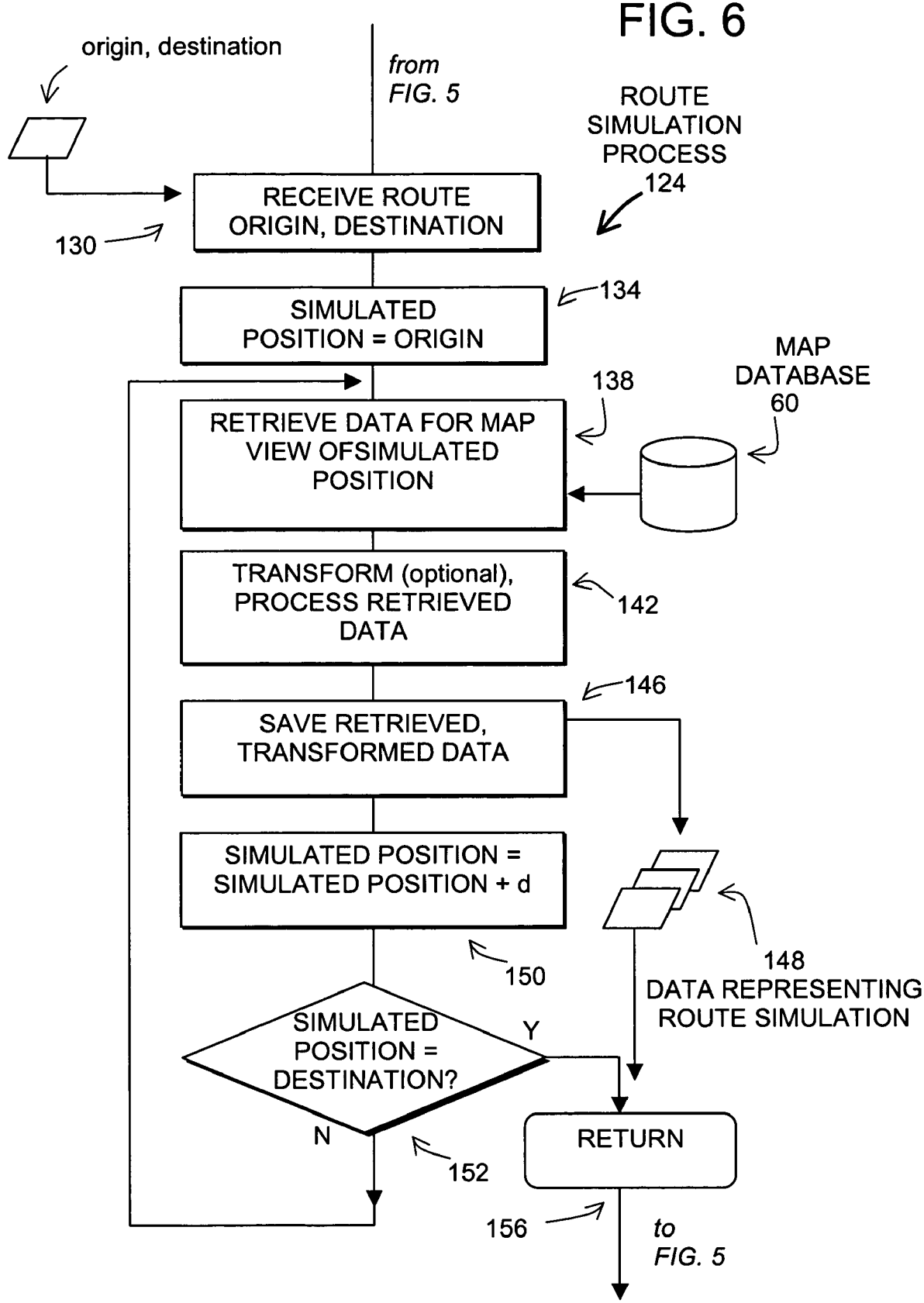
FIG. 6 is a flowchart of a process for providing a route simulation.

FIG. 6 shows steps in a process 124 for providing a route simulation. The data indicating the origin and destination is received (Step 130). A simulated position is set to the origin (Step 134). Data is retrieved from the map database 60 for presenting a map image of the geographic features around the origin (Step 138). This data is transformed, if necessary, and otherwise processed so that it is suitable for rendering as an image on the display of the portable navigation system (Step 142). The processing may include setting of a vantage point, transposing the data (e.g., from a 2D data view to a perspective view), indicating the simulated current position (origin), highlighting the calculated route, etc. The data 148 is then stored in a data storage device in the portable navigation system (Step 146). The data may be stored on a writable media, such as a flash memory. Using the data that indicates the route, a new simulated position is determined (Step 150). The new simulated position is located at a distance, d, advanced along the calculated route from the prior simulated position, where d can be set to any convenient distance. If the new simulated position has not reached the destination (Step 152), the process continues with the step of retrieving data for presenting a map image of the new simulated position (Step 138, again). However, if the new simulated position has reached the destination (Step 152), the simulation process 124 returns to the process 100 in FIG. 5 (Step 156).

Referring again to FIG. 5, after the route simulation has been prepared (Step 120), the current position of the portable navigation system is determined (Step 170). If the current position matches a position on the calculated route (Step 174), the saved simulation data is used to present a map image on the display 18 of the portable navigation system 10 (Step 180). The current position is checked to determine whether the destination has been reached (Step 184). If the destination has not been reached and the current position of the portable navigation system continues to match the calculated route, the process continues to use the saved simulation data to present map images of the areas around the portable navigation system on the display as the portable navigation system is conveyed along the route.

If the portable navigation system departs from the calculated route (Step 174) or after the destination has been reached (Step 184), the data indicating the simulated route can no longer be used to provide the map images of the area around the current position of the portable navigation system. Therefore, if map images of the area around the current position of the portable navigation system are to be displayed, new data is obtained from the map database (Step 190). When new data is obtained from the map database to render a map image of the current position of the portable navigation system after it is no longer on the route, the map image may be a perspective view, an overhead view, or any other type of view.

II. Second Embodiment

A second embodiment provides for using pre-calculated simulation data to render a map image of the geographic features located around a current position of a portable navigation system. The second embodiment is similar to the previously described embodiment but without necessarily including the step of calculating a route to a desired destination before using saved route simulation data to show a current position of the portable navigation system along a road network. The second embodiment provides for using a pre-calculated simulation to render a map image of the geographic features located around a current position of a portable navigation system even if the portable navigation system is not being transported along a calculated route.

In the second embodiment, after a current position of the portable navigation system is determined, map views are determined for simulated travel along those road segments that connect to the road segment on which the portable navigation system is located. These successor road segments include the one or more road segments that directly join the road segment on which the portable navigation system is located at the intersection toward which the portable navigation system is moving. This embodiment is illustrated in connection with FIG. 7.

Figure 7:
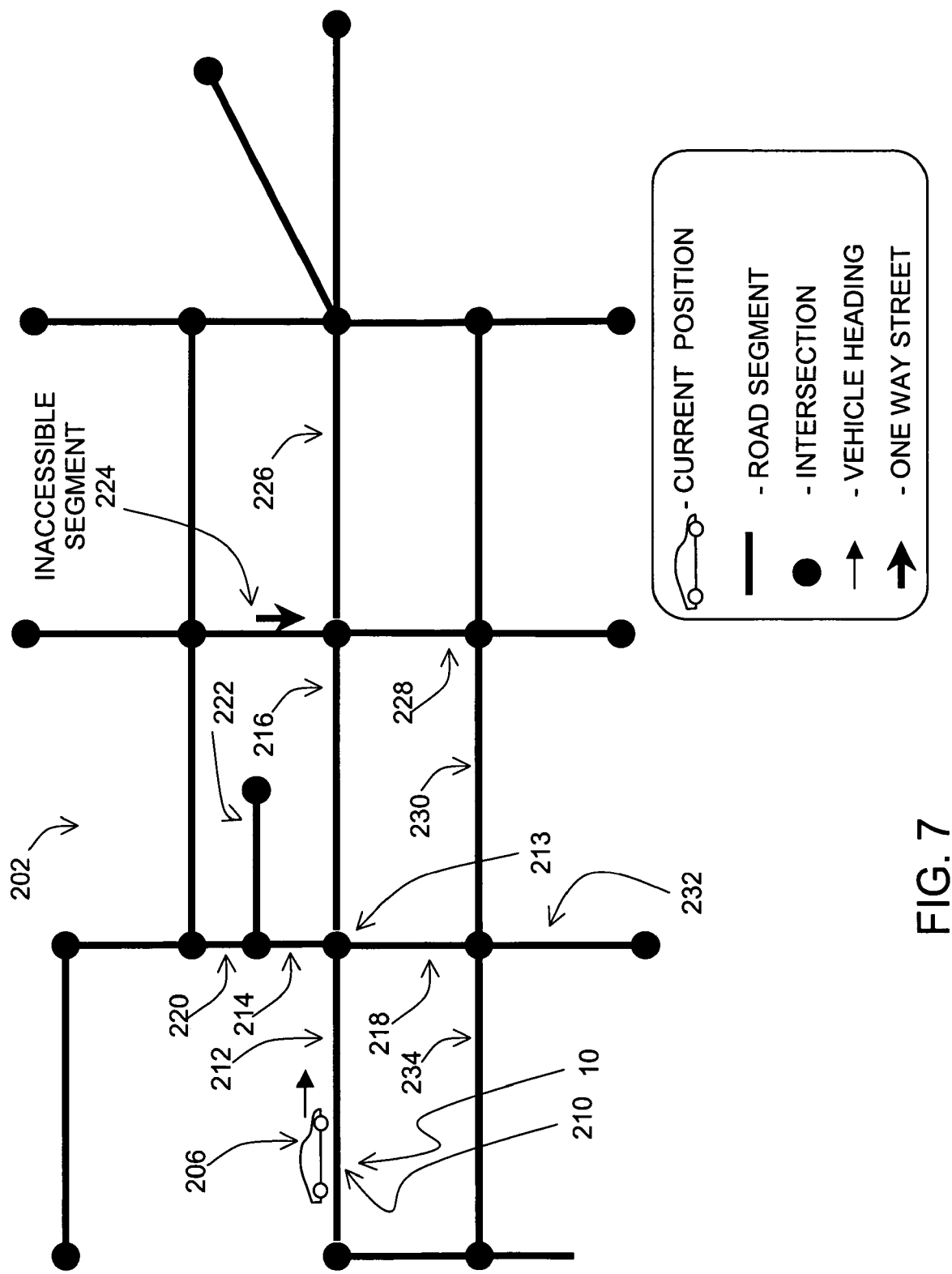
FIG. 7 is used to explain another embodiment of the present invention and illustrates a portion of a road network around a current position of a portable navigation system located in a vehicle.

FIG. 7 shows a portion 202 of a road network. The portable navigation system 10 is located in a vehicle 206. The vehicle 206 is located at a position 210, which is located on a road segment 212. The vehicle is heading toward the intersection 213. The successor road segments are those that connect to the road segment 212 at the intersection 213, namely, the road segments 214, 216 and 218.

According to this embodiment, while the portable navigation system 10 is still located on the road segment 212, data for rendering map images of simulated travel along the road segments 214, 216 and 218 is accessed and stored in a manner similar to what was described in the first embodiment. When the portable navigation system 10 moves past the intersection 213, its position is determined. The portable navigation system is located on either the road segment 214, 216 or 218. When it is determined on which of these road segments the portable navigation system is located, the previously stored data simulating travel along the road segment is used to render a map image on the display of the portable navigation system. For example, if the portable navigation system is transported onto the road segment 216, the saved simulation data indicating travel along the road segment 216 is used to render a display showing travel along this road segment.

In the foregoing example, simulation data was saved for travel along the road segments that are immediate successors to the road segment on which the portable navigation system is located. In alternative embodiments, simulation data may be saved for travel along road segments beyond those that are immediate successors of the road segment on which the portable navigation system is located. For example, referring to FIG. 7, simulation data may also be saved for travel along the road segments 220, 222, 226, 228, 230, 232, and 234. (These road segments are the successors to the immediate successor road segments 214, 216 and 218.)

Simulation data may be saved for travel onto a road segment if it is illegal to travel onto that road segment. For example, in FIG. 7, the road segment 224 is a one-way street, and therefore travel onto the road segment 224 from the road segment 216 is not permitted. Therefore, simulation data for travel onto the road segment 224 does not need to be saved.

III. Alternatives

It has been described that data for rendering a simulation can be used to provide map images on portable navigation systems while actually traveling along a route. This feature is not limited to just portable navigation systems. This feature can be provided by any system that provides navigation- or map-related features. For example, this feature can be provided with in-vehicle navigation systems, i.e., systems permanently installed in vehicles.

In an above embodiment, it was described how a portable navigation system saved data for rendering a simulation of a route prior to embarking on the route and then used the data to render map images of the area around the portable navigation system as it was being conveyed along the actual route. In one embodiment, data for rendering a simulation of an entire route is stored. In alternative embodiments, data for rendering a simulation of only a portion of an entire route is stored. For example, data for rendering a simulation of only that portion of a route up through a first maneuver may be stored. Then, this data is used to provide map images as the navigation system is actually being conveyed along the route up through the first maneuver. As the navigation system approaches the first maneuver, data for rendering a simulation of the next portion of the route, e.g., through the next maneuver, may be stored. This data is then used to provide map images as the navigation system is actually being conveyed along the route up through the next maneuver, and so on. The portions of the route for which simulation data is saved are not limited to portions from one maneuver to the next. Data for any size portion of a route may be saved and then used to provide map images as the navigation system is actually being conveyed along the route.

The embodiments disclosed herein are limited to travel in vehicles along roads, but may be used for any kind of transportation network. The embodiments disclosed herein may be used in systems for pedestrians, bicycles, persons on trains, boats, etc. The embodiments may be used for roads that permit vehicle access and roads that prohibit vehicle access, bike paths, pedestrian paths, sidewalks, ferry routes, mass transit routes, etc. Embodiment may also be used for off-road applications, including terrain.

In the map images shown in FIGS. 3 and 4, the vantage point is located above the position of the navigation system relative to the road network and behind the navigation system, in the direction of travel. From this vantage point, an indicator mark can be superimposed on the image to show the position of the navigation system relative to the road. In alternative embodiments, different locations can be selected for the vantage point of the map image, including vantage points to the sides and vantage points from which the vehicle is not observable. The vantage point can also be at road level, including from the vehicle position.

It is intended that the foregoing detailed description be regarded as illustrative rather than limiting and that it is understood that the following claims including all equivalents are intended to define the scope of the invention.

We claim:

1. A method for displaying information on a computing device comprising the steps of:
   generating a simulation of travel along a route prior to embarking on the route, wherein the simulation comprises a sequence of views of a road network along the route from vantage points above the road network;
   storing data representing the simulation of travel along the route;
   obtaining a current position of the computing device while the computing device is being conveyed along the route; and
   displaying on a display of the computing device the view of the road network from the simulation that shows the current position of the computing device.

2. The method of claim 1 wherein at least some of the views are perspective views.

3. The method of claim 1 wherein at least some of the views include an indicator mark representing the computing device, wherein the indicator mark is located at a position on the view corresponding to the current position of the computing device.

4. The method of claim 1 wherein the data representing the simulation comprises any one or more selected from a group of a video stream and geographic vector data.

5. The method of claim 1 further comprising:
   accessing a map database that contains data representing a geographic area that includes the road network; and
   selecting data from the map database that represents portions of the road network along the route, wherein the data selected from the map database is the data representing the simulation.

6. The method of claim 1 further comprising:
   upon detecting that the current position of the computing device is no longer on the route, accessing a map database that contains data representing a geographic area that includes the current position of the computing device; and
   displaying on the display of the computing device a view of the road network that shows the current position of the computing device, which is no longer on the route.

7. The method of claim 6 wherein the view of the road network that shows the current position of the computing device, which is no longer on the route, is an overhead view.

8. The method of claim 6 wherein the view of the road network that shows the current position of the computing device, which is no longer on the route, is a perspective view.

9. The method of claim 6 wherein the view of the road network that shows the current position of the computing device, which is no longer on the route, also shows an indicator mark representing the computing device, wherein the indicator mark is located at a position on the view corresponding to the current position of the computing device.

10. The method of claim 6 further comprising:
    prior to the step of displaying on the display of the computing device a view of the road network that shows the current position of the computing device, which is no longer on the route, ceasing the step of displaying on the display of the computing device the view of the road network from the simulation.

11. The method of claim 1 wherein the data representing the simulation of travel along a route is obtained from a map database that contains data representing a geographic area that includes the road network.

12. The method of claim 11 wherein the map database is installed in the computing device.

13. The method of claim 1 wherein the computing device is a portable navigation system.

14. The method of claim 1 wherein the computing device is an in-vehicle navigation system.

15. The method of claim 1 wherein the computing device is a portable navigation system that can be removably mounted in a vehicle.

16. The method of claim 1 further comprising:
    prior to the step of storing, calculating a route from an origin to a destination.

17. The method of claim 16 wherein the data representing the simulation of travel along a route includes the data representing the simulation of travel from the origin to the destination.

18. The method of claim 16 wherein the data representing the simulation of travel along a route includes data for traveling only a portion of the way from the origin to the destination.

19. The method of claim 16 wherein the data for rendering a representing the simulation of travel along a route includes data for traveling from one maneuver to another.

20. The method of claim 1 wherein the current position is obtained by a Global Positioning System unit associated with the computing device.

21. The method of claim 1 further comprising:
    prior to the step of storing data representing the simulation, accessing a map database that contains data representing a geographic area that includes the road network;
    selecting 2D data from the map database that represents portions of the road network along the route; and
    transposing the 2D data for rendering a perspective view image, wherein the transposed data is the data which is stored for rendering the simulation.

22. The method of claim 1 wherein at least some of the vantage points are to the sides.

23. The method of claim 1 further comprising:
    matching a speed of travel along the route to a playback speed of the simulation so that the view of the road network from the simulation being displayed corresponds to an actual position of the computing device along the route.

24. The method claim 23 further comprising:
displaying on the display of the computing device the view of the road network from the simulation that corresponds, at least in part, to a next position using the speed of travel along the route when the actual position of the computing device cannot be obtained.

25. The method claim 1 further comprising:
prior to the step of obtaining a current position of the computing device, displaying on the display of the computing device the view of the road network from the simulation based, at least in part, upon an origin to a destination of the route.

26. A method for displaying map information on a computing device comprising the steps of:
generating a simulation of travel along a road segment prior to embarking on travel along the road segment, wherein the simulation comprises a sequence of views of a road network along the road segment from vantage points above the road network;
storing data representing the simulation of travel along the route;
obtaining a current position of the computing device while the computing device is being conveyed along the route; and
displaying on a display of the computing device the view of the road network from the simulation that shows the current position of the computing device.

27. The method of claim 26 wherein at least some of the views are perspective views.

28. The method of claim 26 wherein at least some of the views include an indicator mark representing the computing device, wherein the indicator mark is located at a position on the view corresponding to the current position of the computing device.

29. The method of claim 26 wherein the data representing the simulation comprises any one or more selected from a group of a video stream and geographic vector data.

30. The method of claim 26 further comprising:
accessing a map database that contains data representing a geographic area that includes the road network; and
selecting data from the map database that represents portions of the road network along the road segment, wherein the data selected from the map database is the data representing the simulation.

31. The method of claim 26 wherein the current position is obtained by a Global Positioning System unit associated with the computing device.

32. The method of claim 26 wherein the data representing the simulation of travel along a road segment is obtained from a map database that contains data representing a geographic area that includes the road network.

33. The method of claim 32 wherein the map database is installed in the computing device.

34. The method of claim 26 further comprising:
prior to reaching a far end of the road segment upon which the computing device is being conveyed, storing data representing a simulation of travel along a successor road segment, wherein the successor road segment connects to the far end of the road segment upon which the computing device is being conveyed, and wherein the simulation comprises a sequence of views of the road network along the successor road segment from vantage points above the successor road segment.

35. The method of claim 34 further comprising:
while the computing device is being conveyed along the successor road segment, obtaining a current position of the computing device; and
displaying on the display of the computing device the view of the road network from the simulation that shows the current position of the computing device on the successor road segment.

36. The method of claim 26 further comprising:
prior to reaching a far end of the road segment upon which the computing device is being conveyed, storing data representing a simulation of travel along each successor road segment that connects to the far end of the road segment upon which the computing device is being conveyed, and wherein each simulation comprises a sequence of views of the road network along the corresponding successor road segment from vantage points above the corresponding successor road segment.

37. The method of claim 26 wherein the computing device is a portable navigation system.

38. The method of claim 26 wherein the computing device is an in-vehicle navigation system.

39. The method of claim 26 wherein the computing device is a portable navigation system that can be removably mounted in a vehicle.

40. The method of claim 26 further comprising:
prior to the step of storing data representing the simulation, accessing a map database that contains data representing a geographic area that includes the road network;
selecting 2D data from the map database that represents portions of the road network along the road segment; and
transposing the 2D data representing a perspective view image, wherein the transposed data is the data representing the simulation.

41. The method of claim 26 further comprising:
matching a speed of travel along the road segment to a playback speed of the simulation so that the view of the road network from the simulation being displayed corresponds to an actual position of the computing device along the road segment.

42. The method claim 41 further comprising:
displaying on the display of the computing device the view of the road network from the simulation that corresponds, at least in part, to a next position using the speed of travel along the route when the actual position of the computing device cannot be obtained.

43. The method claim 26 further comprising:
prior to the step of obtaining a current position of the computing device, displaying on the display of the computing device the view of the road network from the simulation based, at least in part, upon an origin to a destination of the route.

* * * * *